(12) United States Patent
Urano et al.

(10) Patent No.: US 8,746,952 B2
(45) Date of Patent: Jun. 10, 2014

(54) ILLUMINATION APPARATUS, DISPLAY APPARATUS, AND ELECTRONIC DEVICE

(75) Inventors: Nobutaka Urano, Chino (JP); Yoichi Momose, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 22 days.

(21) Appl. No.: 13/553,201

(22) Filed: Jul. 19, 2012

(65) Prior Publication Data

US 2013/0027977 A1 Jan. 31, 2013

(30) Foreign Application Priority Data

| Jul. 25, 2011 | (JP) | ................................. 2011-161708 |
| Nov. 21, 2011 | (JP) | ................................. 2011-253716 |
| Nov. 21, 2011 | (JP) | ................................. 2011-253717 |

(51) Int. Cl.
*F21V 7/04* (2006.01)

(52) U.S. Cl.
USPC ......... 362/634; 362/97.1; 362/97.3; 362/632; 362/631; 349/58; 349/65

(58) Field of Classification Search
USPC ............... 362/97.1–97.4, 612–615, 632–634; 349/58, 61–65, 67, 70
See application file for complete search history.

(56) References Cited

U.S. PATENT DOCUMENTS

| 6,593,979 | B1 * | 7/2003 | Ha et al. ........................... 349/58 |
| 8,502,933 | B2 * | 8/2013 | Park et al. ........................ 349/58 |
| 8,540,411 | B2 * | 9/2013 | Lee et al. ........................ 362/606 |
| 2006/0072345 | A1 * | 4/2006 | Ho et al. ........................ 362/633 |
| 2007/0091644 | A1 * | 4/2007 | Fujishima ..................... 362/630 |
| 2008/0316771 | A1 * | 12/2008 | Mori et al. .................... 362/633 |
| 2011/0037920 | A1 | 2/2011 | Kim et al. |
| 2012/0127391 | A1 * | 5/2012 | Ahn et al. ........................ 349/58 |
| 2013/0077014 | A1 * | 3/2013 | Yang ............................... 349/58 |

FOREIGN PATENT DOCUMENTS

| JP | A-2009-3081 | 1/2009 |
| JP | A-2011-40388 | 2/2011 |

* cited by examiner

*Primary Examiner* — Nimeshkumar Patel
*Assistant Examiner* — Jose M Diaz
(74) *Attorney, Agent, or Firm* — Oliff PLC

(57) ABSTRACT

In an illumination apparatus, a plurality of light-emitting elements are mounted to one surface (a first surface) of a light source substrate. The light source substrate is anchored to a substrate support portion using a screw that is tightened down into the substrate support portion from the opposite side as the light source substrate. Meanwhile, the light source substrate includes a metallic plate that configures another surface (a second surface) and a flexible wiring board that is affixed to the metallic plate on the side of the one surface (the first surface), and a through-hole that passes through the metallic plate is formed, as the hole for tightening down the screw, in the location of the light source substrate in which the screw is tightened.

11 Claims, 9 Drawing Sheets

ILLUMINATION APPARATUS, DISPLAY APPARATUS, AND ELECTRONIC DEVICE

BACKGROUND

1. Technical Field

The present invention relates to illumination apparatuses provided with light guiding plates and light-emitting elements, display apparatuses provided with such illumination apparatuses, and electronic devices provided with such display apparatuses.

2. Related Art

Of the various types of display apparatuses, liquid-crystal apparatuses include an illumination apparatus referred to as a "light guiding plate apparatus" and a transmissive or partially-transmissive display panel (liquid-crystal panel) disposed on top of the illumination apparatus in an overlapping manner on the side of the light-emitting surface thereof; in the illumination apparatus, a plurality of light-emitting elements are provided along the side-end surfaces of the light guiding plate that function as light-entry portions.

As shown in FIG. 9, in an illumination apparatus configured in this manner, a configuration is often employed in which a plurality of light-emitting elements 1089 are mounted on a light source substrate 1088 on one surface 1881 that opposes a side-end surface of a light guiding plate 1080, and the light source substrate 1088 is anchored to a substrate support plate portion 1062 using screws. At this time, when the screws are tightened from the side of the one surface 1881 of the light source substrate 1088, areas where the light diffusion characteristics are uneven arise in the one surface 1881 of the light source substrate 1088 due to differences in the surface states on both sides of the locations where the screws are disposed, in the lengthwise direction of the light source substrate 1088. As a result, unevenness in the brightness of the illumination light emitted from the light guiding plate occurs, resulting in a problem that the image quality is reduced.

Meanwhile, a structure in which through-holes 1625 are formed in the substrate support plate portion 1062 and the light source substrate 1088 is anchored to the substrate support plate portion 1062 by tightening screws 1086 into the substrate support plate portion 1062 from the opposite side as the light source substrate 1088 has been proposed (see JP-A-2011-40388, FIG. 13 and so on, and JP-A-2009-3081, FIGS. 2, 7, 10, and so on).

To realize this configuration, closed-ended holes 1885 that span to a position partway through the thickness direction of the light source substrate 1088 are formed from another surface 1882 of the light source substrate 1088, and the screws 1086 are tightened into the holes 1885.

However, as shown in FIG. 9, it is necessary to properly manage the depth of the holes 1885 in order to form those closed-ended holes 1885 that span to a position partway through the thickness direction of the light source substrate 1088 from the other surface 1882 of the light source substrate 1088, and thus a great amount of effort is required to form the holes 1885. In other words, as described above, if the holes 1885 are passed through the light source substrate 1088, the surfaces of the screws 1086 that pass through and are exposed on the side of the one surface 1881 of the light source substrate 1088 will cause differences from other surfaces in the light diffusion state, reflection state, and so on; this leads to areas of optical unevenness, which causes the uniformity of the illumination to be lost. Alternatively, there may be the risk that wires formed on the one surface 1881 of the light source substrate 1088 will become disconnected. On the other hand, if the holes 1885 are too shallow, the light source substrate 1088 will be pressurized by the screws 1086 when the screws 1086 are tightened down, resulting in the light source substrate 1088 deforming and the optical axes of the light-emitting elements 1089 tilting.

SUMMARY

It is an advantage of some aspects of the invention to provide an illumination apparatus in which screw-holes can be formed at an appropriate depth in a light source substrate on which a light-emitting element is mounted in order to anchor the light source substrate to a substrate support plate portion using screws, a display apparatus provided with such an illumination apparatus, and an electronic device provided with such a display apparatus.

An illumination apparatus according to an aspect of the invention includes: a light guiding plate; a plurality of light-emitting elements disposed along a side-end surface of the light guiding plate that serves as a light-entry portion, each of the plurality of light-emitting elements has a light-emitting surface facing toward the side-end surface; a light source substrate that extends along a direction which the side-end surface extends, a first surface of the light source substrate on which the plurality of light-emitting elements are mounted, and a second surface which is another surface of the light source substrate that opposes the first surface; a substrate support portion which has a third surface that faces the second surface and a fourth surface that opposes the third surface; and a screw that tightens the light source substrate to the substrate support portion from the fourth surface without being exposed on the first surface of the light source substrate. Here, the light source substrate has a first substrate that configures the second surface and a second substrate that configures the first surface; and a through-hole that passes through the first substrate is formed in a location of the light source substrate where the screw is tightened down.

In the invention, the plurality of light-emitting elements are mounted on the first surface of the light source substrate, and the light source substrate is anchored to the substrate support plate portion disposed on the second surface using the screw. Here, the screw is tightened down into the substrate support plate portion from the opposite side as the light source substrate, and thus the screw is not exposed on the side of the first surface of the light source substrate. For this reason, portions having uneven light diffusion characteristics caused by the screw do not arise on the side of the first surface of the light source substrate, and thus it is difficult for unevenness in the brightness of the illumination light emitted from the light guiding plate to occur. In addition, the first substrate that configures the second surface of the light source substrate is a metallic plate, and the second substrate that configures the first surface of the light source substrate is a flexible wiring board that is affixed to the first substrate on the side of the first surface. The through-hole that passes through the first substrate (the metallic plate) is formed, as a hole for tightening the screw, in a location of the light source substrate where the screw is to be tightened. Accordingly, the depth of the hole into which the screw is tightened is determined primarily based on an appropriate depth depending on the thickness of the metallic plate, and thus problems caused by the hole being too deep, problems caused by the hole being too shallow, and so on do not occur.

In the invention, it is preferable for the through-hole to be formed in a location that does not overlap with the locations where the light-emitting elements are mounted. According to this configuration, the light-emitting elements can be mounted properly.

In the invention, it is preferable for a metallic layer to be formed in a region of the flexible wiring board that overlaps with the through-hole. According to this configuration, the tip of the screw is covered by the metallic layer, and thus the influence of the screw is not transmitted to the flexible wiring board.

In the invention, it is preferable for a side-end surface of the first substrate (the metallic plate) and a side-end surface of the second substrate (the flexible wiring board) to be cut surfaces that are continuous with each other. In other words, when forming the light source substrate, it is preferable for a large-scale first substrate (metallic plate) and a large-scale second substrate (flexible wiring board) to be affixed to each other, and then for the first substrate (metallic plate) and the second substrate (flexible wiring board) to be cut at the same time in order to form the individually-sized light source substrate. According to this configuration, the through-hole can be formed in the first substrate (the metallic plate) before affixing the first substrate (the metallic plate) and the second substrate (the flexible wiring board), which makes it possible to increase the ease of production.

In the invention, it is preferable for the first substrate (the metallic plate) to be thicker than the second substrate (the flexible wiring board). According to this configuration, the second substrate (the flexible wiring board) can be supported with certainty, and heat produced by the light-emitting elements can escape via the first substrate (the metallic plate).

In the invention, it is preferable for the through-hole to be a screw hole. According to this configuration, a large force is not applied to the light source substrate when tightening the screw, which makes it possible to prevent the light source substrate from deforming.

In the invention, it is preferable for the substrate support plate portion to be made of a metal. According to this configuration, the heat produced by the light-emitting elements can escape to the substrate support plate portion via the metallic plate.

It is effective for the invention to be applied in the case where the first surface of the light source substrate opposes the light-entry portion. In the case where the first surface of the light source substrate opposes the light-entry portion, it is easy for problems to arise due to the screw being exposed on the side of the first surface, but according to the invention, the occurrence of such a problem can be prevented.

The illumination apparatus according to the invention can be used in a display apparatus, and in such a case, the display apparatus includes a display panel disposed overlapping a light-emitting surface side of the light guiding plate.

The display apparatus according to the invention can also be used in an electronic device such as an LCD television.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
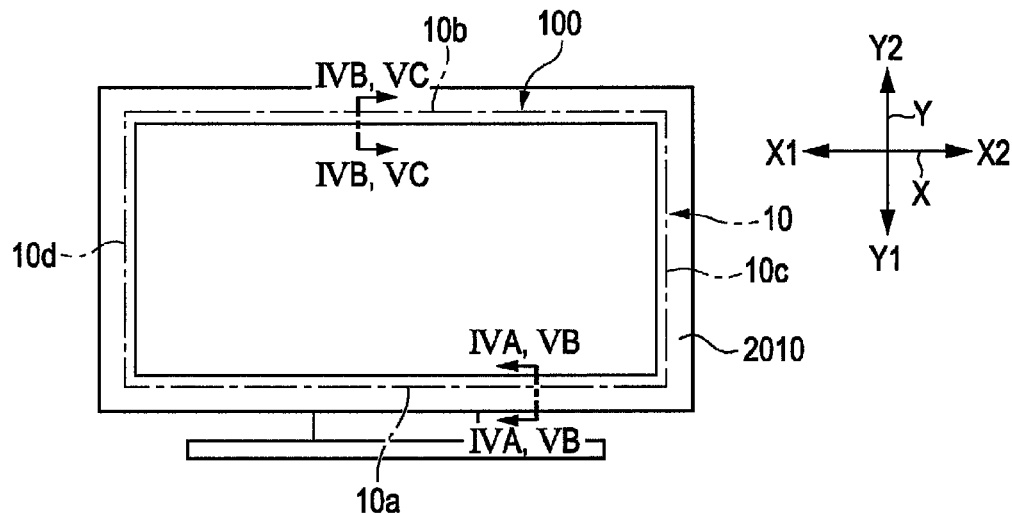
FIGS. 1A and 1B are schematic diagrams illustrating an LCD television (electronic device) provided with a display apparatus according to a first embodiment of the invention.

Embodiments in which the invention has been applied in a display apparatus for a LCD television will be described hereinafter with reference to the drawings. Note that in the drawings referred to in the following descriptions, the dimensions of various layers, members, and so on have been varied in order to illustrate those layers, members, and so on at sizes that can be viewed more easily. It should also be noted that in the following descriptions, the planar directions of a light guiding plate, a liquid-crystal panel, and so on that are orthogonal to each other are taken as the X-axis direction (the direction along which the long side of the light guiding plate, the liquid-crystal panel, or the like (a display panel) extends in the drawings) and the Y-axis direction (the direction along which the short side of the light guiding plate, the liquid-crystal panel, or the like extends in the drawings), and the direction that is orthogonal to both the X-axis direction and the Y-axis direction (the direction along which the light guiding plate and the liquid-crystal panel are layered in the drawings) is taken as the Z-axis direction. Furthermore, in the drawings referred to hereinafter, one side of the X-axis direction is taken as an X1 side, and the other side is taken as an X2 side; one side of the Y-axis direction (the direction in which an overhang portion of the liquid-crystal panel is disposed) is taken as a Y1 side, and the other direction opposed thereto is taken as a Y2 side; and one side of the Z-axis direction (the direction facing the rear surface of the light guiding plate) is taken as a Z1 side (a bottom side), and the other direction opposed thereto (the side toward which illumination light, display light, and so on are emitted) is taken as a Z2 side (a top side).

First Embodiment

Overall Configuration

Figure 1B:
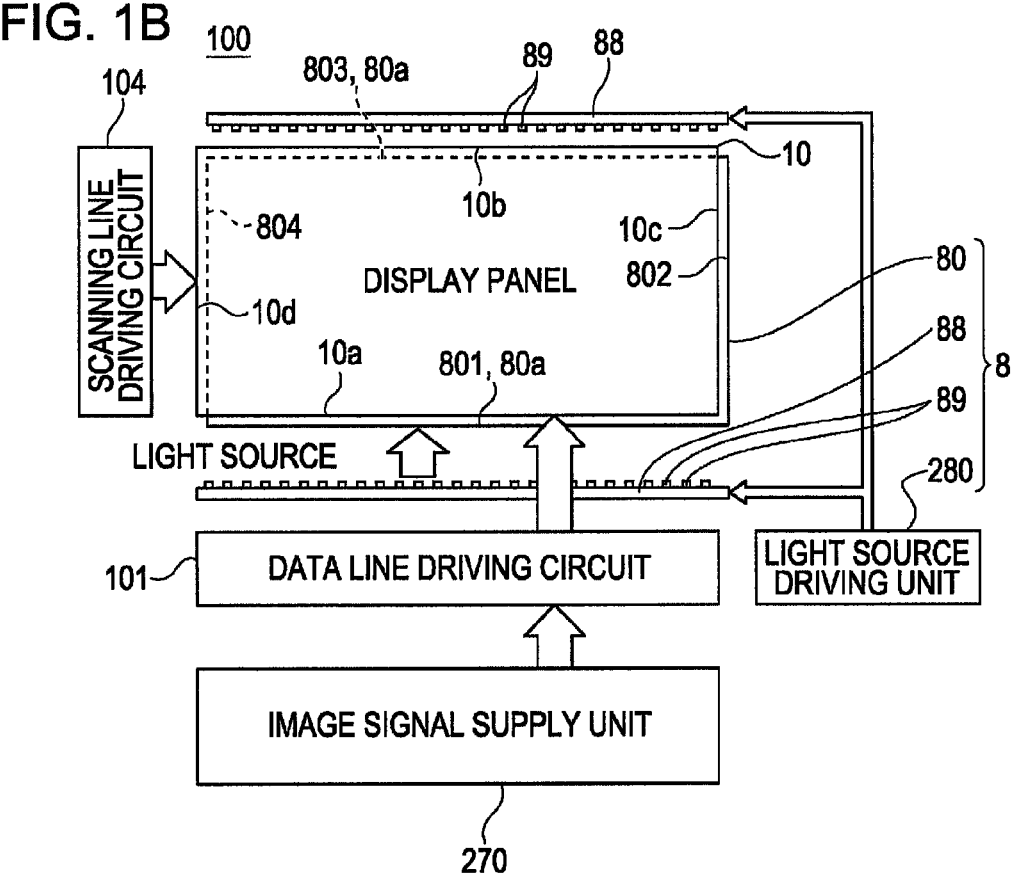

FIGS. 1A and 1B are schematic diagrams illustrating an LCD television (electronic device) provided with a display apparatus according to a first embodiment of the invention, where FIG. 1A is a schematic diagram illustrating the LCD television from the exterior thereof, and FIG. 1B is a block diagram illustrating the electrical configuration of the display apparatus.

An electronic device 2000 shown in FIG. 1A is an LCD television, and includes a display apparatus 100, a television frame 2010, and so on. As shown in FIG. 1B, the display apparatus 100 includes a display panel 10 (a liquid-crystal panel), which will be mentioned later with reference to FIGS. 2A, 2B, and so on, an image signal supply unit 270 that supplies image signals to the display panel 10, and an illumination apparatus 8 that supplies illumination light to the display panel 10. In addition, the display apparatus 100 includes a scanning line driving circuit 104 that drives scanning lines extending in the display panel 10 in the X-axis direction thereof, and a data line driving circuit 101 that drives data lines extending in the display panel 10 in the Y-axis direction thereof. A configuration in which the scanning line driving circuit 104 and the data line driving circuit 101 are both installed in the display panel 10 can be employed. Alternatively, a configuration in which one of the scanning line driving circuit 104 and the data line driving circuit 101 is installed in the display panel 10 and the other is installed in a COG-mounted driving IC in the display panel 10 can be employed. Furthermore, a configuration in which one of the scanning line driving circuit 104 and the data line driving circuit 101 is installed in the display panel 10 and the other is installed in a driving IC mounted on a circuit board that is electrically connected to the display panel 10 can be employed. Further still, a configuration in which both the scanning line driving circuit 104 and the data line driving circuit 101 are installed in a driving IC that is separate from the display panel 10 can be employed.

In this embodiment, the illumination apparatus 8 includes: a light guiding plate 80 disposed so as to overlap with the display panel 10; a plurality of light-emitting elements 89 disposed along side-end surfaces of the light guiding plate 80 that are assigned as light-entry portions 80*a*; light source substrates 88 on which the plurality of light-emitting elements 89 are mounted; and a light source driving unit 280 that drives the light-emitting elements 89. In this embodiment, the display panel 10 is a laterally-long quadrangle having four sides 10*a*, 10*b*, 10*c*, and 10*d*. Of the sides 10*a*, 10*b*, 10*c*, and 10*d*, the side 10*a* is a long side located on the one side Y1 in the Y-axis direction, the side 10*b* is a long side located on the other side 12 in the Y-axis direction, the side 10*c* is a short side located on the other side X2 in the X-axis direction, and the side 10*d* is a short side located on the one side X1 in the X-axis direction. In correspondence with this shape, the light guiding plate 80 has four side-end surfaces 801, 802, 803, and 804. Of these side-end surfaces 801, 802, 803, and 804, the side-end surface 801 is located on the long side corresponding to the one side Y1 in the Y-axis direction, the side-end surface 803 is located on the long side corresponding to the other side Y2 in the Y-axis direction, the side-end surface 802 is located on the short side corresponding to the other side X2 in the X-axis direction, and the side-end surface 804 is located on the short side corresponding to the one side X1 in the X-axis direction. In this embodiment, of the four side-end surfaces 801, 802, 803, and 804 of the light guiding plate 80, the two side-end surfaces 801 and 803 that are opposed in the short side direction (the Y-axis direction) serve as the light-entry portions 80*a*. Accordingly, the light-emitting elements 89 are disposed along each of the two side-end surfaces 801 and 803 (the light-entry portions 80*a*) in the light guiding plate 80, and the light source substrates 88 extend along the respective side-end surfaces 801 and 803 (light-entry portions 80*a*) in the light guiding plate 80.

Detailed Configuration of Display Apparatus 100

Figure 2A:
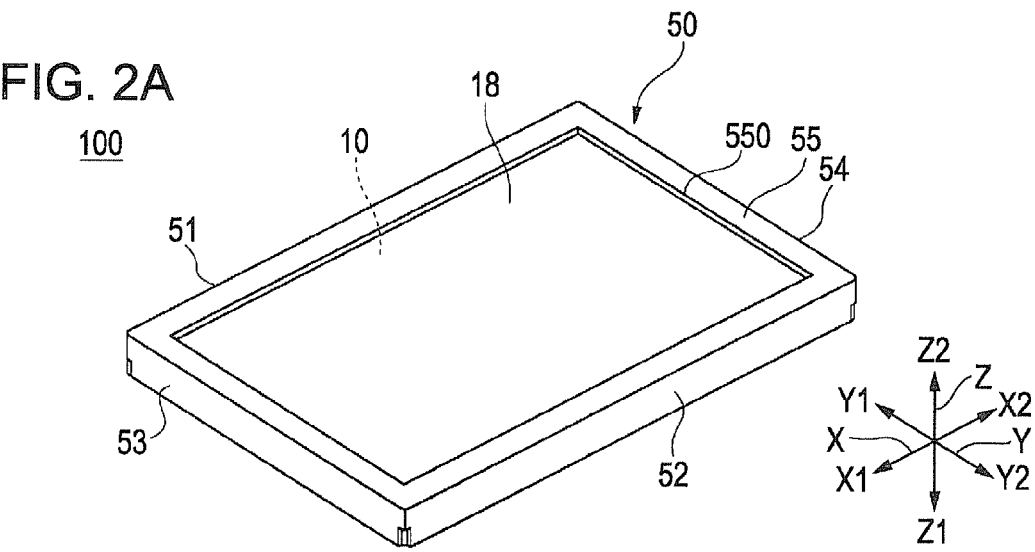
FIGS. 2A and 2B are schematic diagrams illustrating the overall configuration of a display apparatus according to the first embodiment of the invention.
Figure 2B:
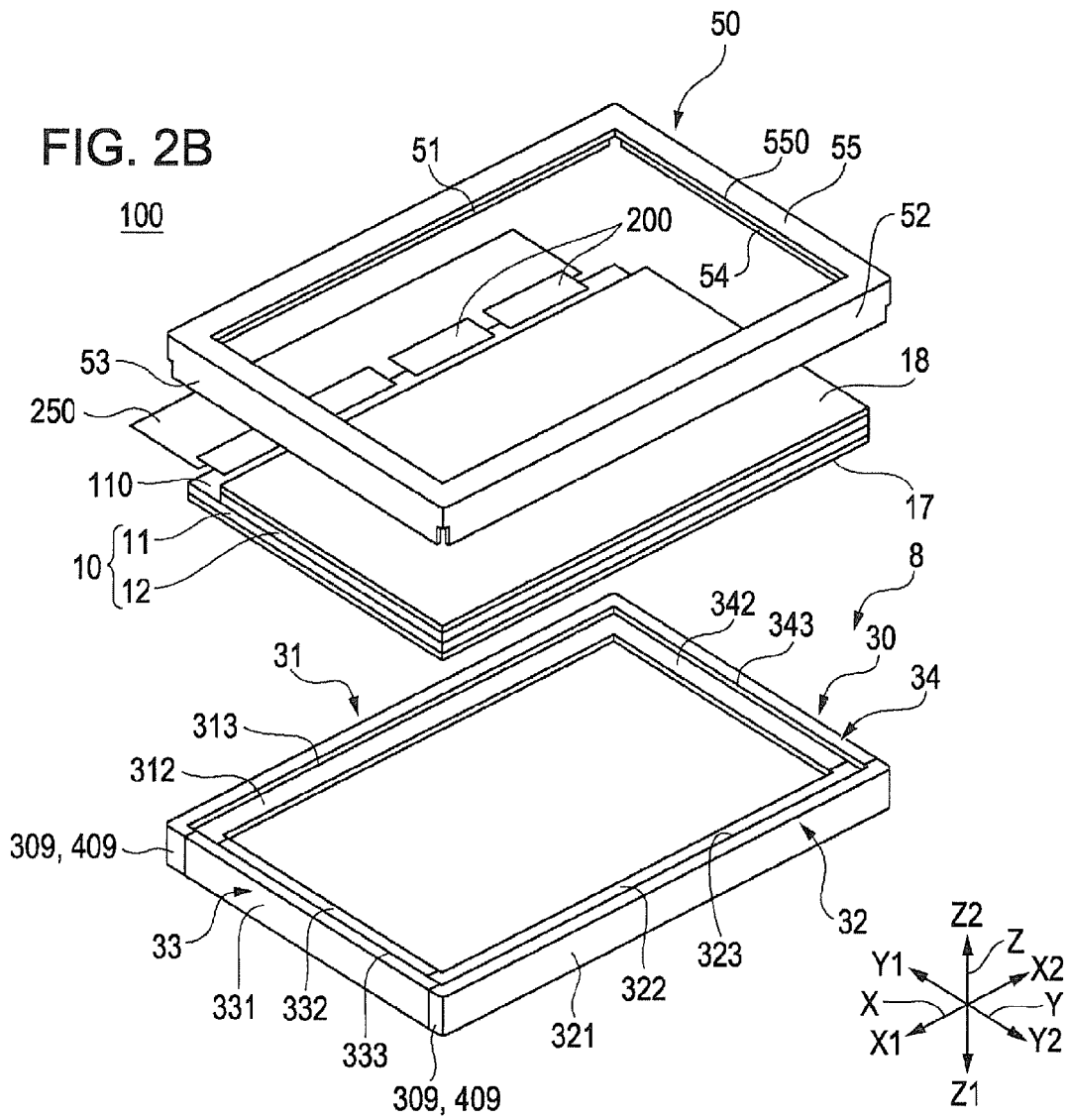
Figure 3:
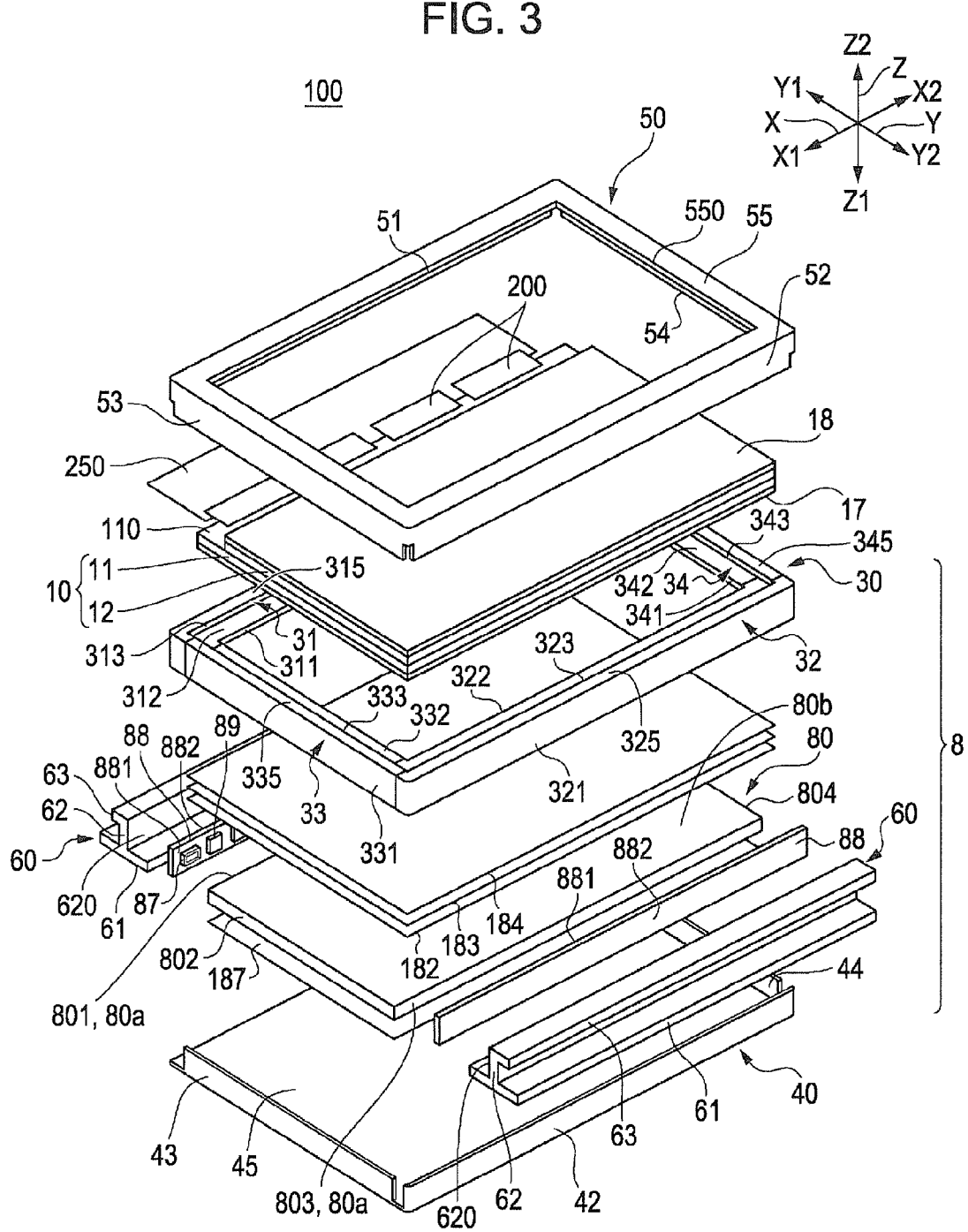
FIG. 3 is an exploded perspective view showing the display apparatus according to the first embodiment of the invention on a more detailed level.
Figure 4A:
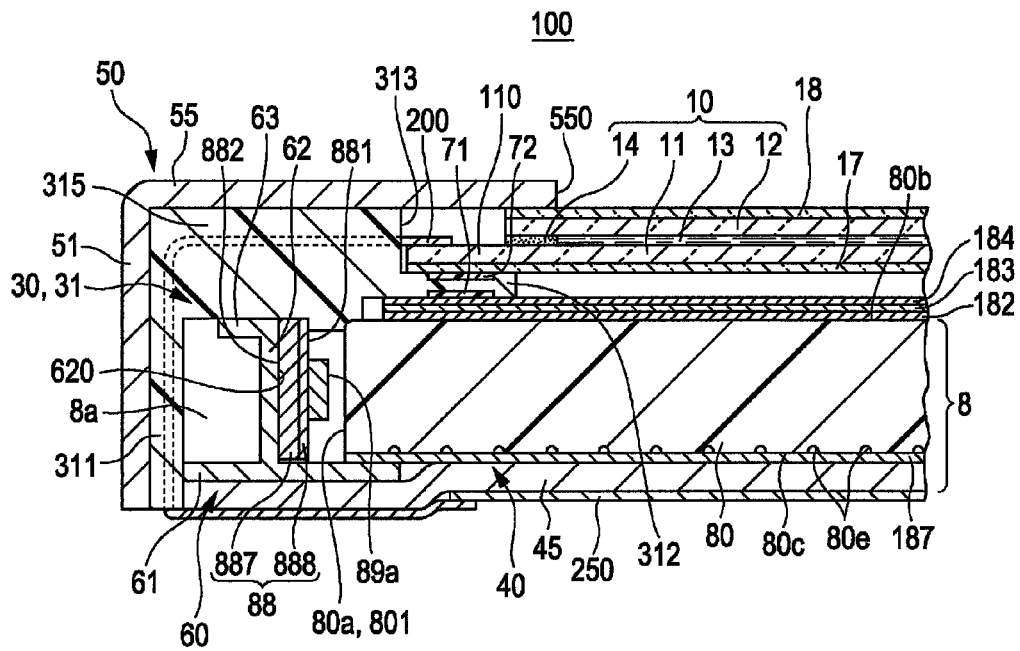
FIGS. 4A and 4B are cross-sectional views illustrating the main elements of the display apparatus according to the first embodiment of the invention.
Figure 4B:
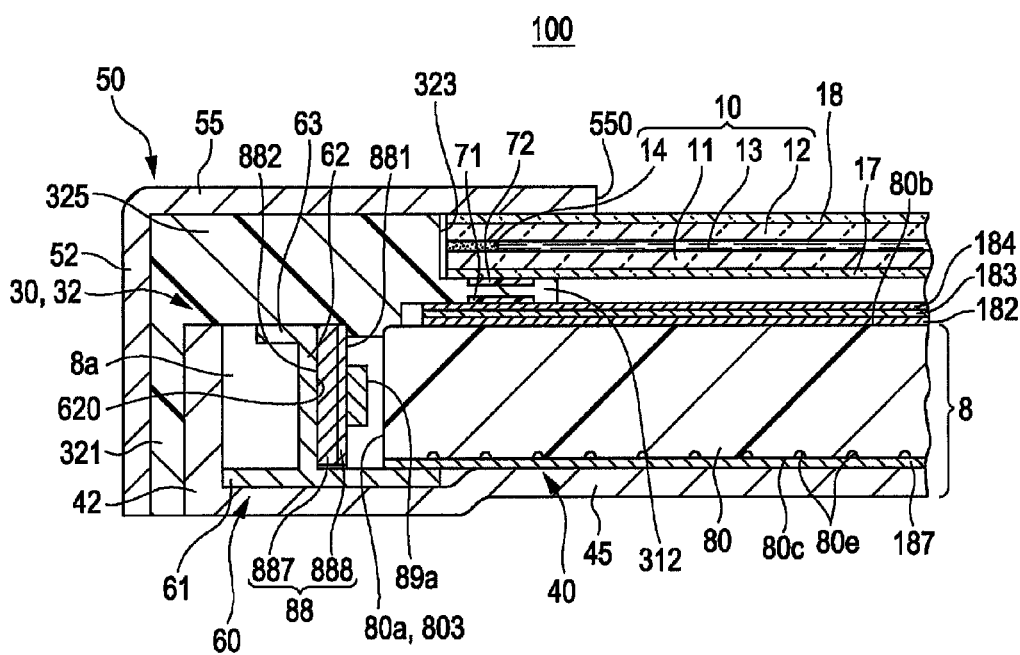

FIGS. 2A and 2B are schematic diagrams illustrating the overall configuration of the display apparatus 100 according to the first embodiment of the invention, and are a perspective view and an exploded perspective view, respectively, of the display apparatus 100. FIG. 3 is an exploded perspective view showing the display apparatus 100 according to the first embodiment of the invention on a more detailed level. FIGS. 4A and 4B are cross-sectional views illustrating the main elements of the display apparatus 100 according to the first embodiment of the invention, and are a cross-sectional view taken along the IVA-IVA line of the display apparatus 100 shown in FIG. 1A and a cross-sectional view taken along the IVB-IVB line of the display apparatus 100 shown in FIG. 1A, respectively.

In FIGS. 2A, 2B, 3, 4A, and 4B, the display apparatus 100 according to this embodiment is, generally speaking, configured of the illumination apparatus 8, which is referred to as a light guiding plate, and the transmissive type display panel 10, which is disposed so as to overlap with the top surface of the illumination apparatus 8. In this embodiment, the display panel 10 is configured of a transmissive type liquid-crystal panel. In the display apparatus 100, the illumination apparatus 8 includes: a metallic first frame 40 (lower metal frame/metallic frame) disposed so as to cover the rear surface of the light guiding plate 80 on the bottom side (one side Z1 in the Z-axis direction); a resinous second frame 30 (resin frame) that holds the ends of the display panel 10 above the first frame 40 and surrounds and holds the illumination apparatus 8; and a metallic third frame 50 (upper metal frame) disposed on the top side (another side Z2 in the Z-axis direction) of the second frame 30.

The second frame 30 has a rectangular frame shape that holds the ends of the display panel 10 and surrounds the outside of the display panel 10, and in this embodiment, the second frame 30 is configured of four frame plates 31, 32, 33, and 34 that are divided into four side sections corresponding to the four sides of the display panel 10. In this embodiment, the second frame 30 is black, and prevents the occurrence of stray light within the illumination apparatus 8 by functioning as a light absorption member. The frame plates 31, 32, 33, and 34 respectively include: side plate portions 311, 321, 331, and 341 that extend downward from the outer surface sides of the frame plates 31, 32, 33, and 34; upper plate portions 315, 325, 335, and 345 (end plate portions) that are bent inward from the upper edges of the side plate portions 311, 321, 331, and 341, respectively; and protruding plate portions 312, 322, 332, and 342 that protrude inward from a position partway along the height direction of the upper plate portions 315, 325, 335, and 345, respectively. Accordingly, step portions 313, 323, 333, and 343 are formed by the protruding plate portions 312, 322, 332, and 342 on the inner sides of the frame plates 31, 32, 33, and 34, respectively, and the display panel 10 is held by the step portions 313, 323, 333, and 343 and the protruding plate portions 312, 322, 332, and 342. Meanwhile, the light guiding plate 80, the light-emitting elements 89, and so on of the illumination apparatus 8 are disposed on the bottom side of the protruding plate portion 312.

The first frame 40 is formed through press-machining a thin metal plate such as SUS or the like. The first frame 40 includes a base plate portion 45 and three side plate portions 42, 43, and 44 that stand erect from the three outer edges of the base plate portion 45 aside from the edge corresponding to the one side Y1 in the Y-axis direction, and has a rectangular box-shape whose top surface is open. The side plate portions 321, 331, and 341 of the second frame 30 overlap on the outside of the side plate portions 42, 43, and 44, respectively, of the first frame 40. Meanwhile, the side plate portion 311 of the second frame 30 covers the one side Y1 of the first frame 40 in the Y-axis direction.

The third frame 50 is, like the first frame 40, formed through press-machining a thin metal plate such as SUS or the like. The third frame 50 includes a rectangular upper plate portion 55 (end plate member) and four side plate portions 51, 52, 53, and 54 formed by bending the outer edges of the upper plate portion 55 downward therefrom, and has a rectangular box-shape whose bottom surface is open. The side plate portions 51, 52, 53, and 54 overlap on the outside of the side plate portions 311, 321, 331, and 341, respectively, of the second frame 30. A rectangular window 550 that emits the light emitted from the display panel 10 is formed in the upper plate portion 55, and the upper plate portion 55 covers the entire circumference of the outer circumferential edges of the side of the display panel 10 that emits display light.

The third frame 50, second frame 30, and first frame 40 configured in this manner are connected using screws (not shown), and the display panel 10, illumination apparatus 8, and so on are held therein as a result. Here, as shown in FIGS. 4A and 4B, flexible sheets 71 and 72 are affixed to the bottom surface and top surface, respectively, of the protruding plate portions 312, 322, 332, and 342 of the second frame 30. Accordingly, when the display apparatus 100 is assembled, the display panel 10 is supported by the protruding plate portions 312 through 342 via the flexible sheet 72. Likewise, when the display apparatus 100 is assembled, the illumination apparatus 8 is supported via the flexible sheet 71. Furthermore, when the display apparatus 100 is assembled, optical sheets of the illumination apparatus 8 (a diffusion sheet 182, prism sheets 183 and 184, and so on) are suppressed from lifting, positional skewing, and so on via the flexible sheet 71.

Configuration of Display Panel 10

As shown in FIGS. 2A, 2B, 3, 4A, and 4B, the display panel 10 includes: an element substrate 11 having a planar quadrangular shape and in which pixel electrodes (not shown) and the like are formed); an opposing substrate 12 disposed opposite to the element substrate 11 with a predetermined gap provided therebetween; and a sealant 14 that affixes the opposing substrate 12 and the element substrate 11 to each other. In the display panel 10, a liquid-crystal layer 13 is held within a region surrounded by the sealant 14. The element substrate 11 and the opposing substrate 12 are configured of light-transmissive substrates such as glass substrates. In the element substrate 11, a plurality of scanning lines (not shown) extend along the X-axis direction, whereas a plurality of data lines extend along the Y-axis direction; switching elements (not shown) and pixel electrodes are provided corresponding to each location where the scanning lines and data lines intersect (not shown).

In this embodiment, the opposing substrate 12 is disposed on the side toward which display light is emitted, and the element substrate 11 is disposed on the side of the illumination apparatus 8. Meanwhile, a frame-shaped layer (not shown) configured of a light-blocking layer is formed on the surface of the opposing substrate 12 that is opposed to the element substrate 11 so as to follow the inner edges of the sealant 14. The display panel 10 is configured of a TN (twisted nematic), ECB (electrically-controlled birefringence), or VAN (vertical aligned nematic) liquid-crystal panel; the pixel electrodes are formed in the element substrate 11, and a common electrode (not shown) is formed in the opposing substrate 12. Note that in the case where the display panel 10 is an IPS (in-plane switching) or FFS (fringe field switching) liquid-crystal panel, the common electrode is provided in the element substrate 11. The element substrate 11 may also be disposed on the side of the opposing substrate 12 toward which the display light is emitted. An upper polarization plate 18 is disposed overlapping the upper surface of the display panel 10, and a lower polarization plate 17 is disposed between the lower surface of the display panel 10 and the illumination apparatus 8.

In this embodiment, the element substrate 11 is larger than the opposing substrate 12. Accordingly, the element substrate 11 includes an overhang portion 110 that extends past the end portion of the opposing substrate 12 on the one side Y1 in the Y-axis direction, and a plurality of flexible wiring boards 200 are connected to the top surface of the overhang portion 110. The flexible wiring boards 200 are connected to a circuit board 250 configured of a rigid board, and a control IC (not shown) that configures the image signal supply unit 270 described with reference to FIG. 1, a light source driving IC (not shown) that configures the light source driving unit 280, and so on are mounted on the circuit board 250.

Configuration of Illumination Apparatus 8

Figure 5A:
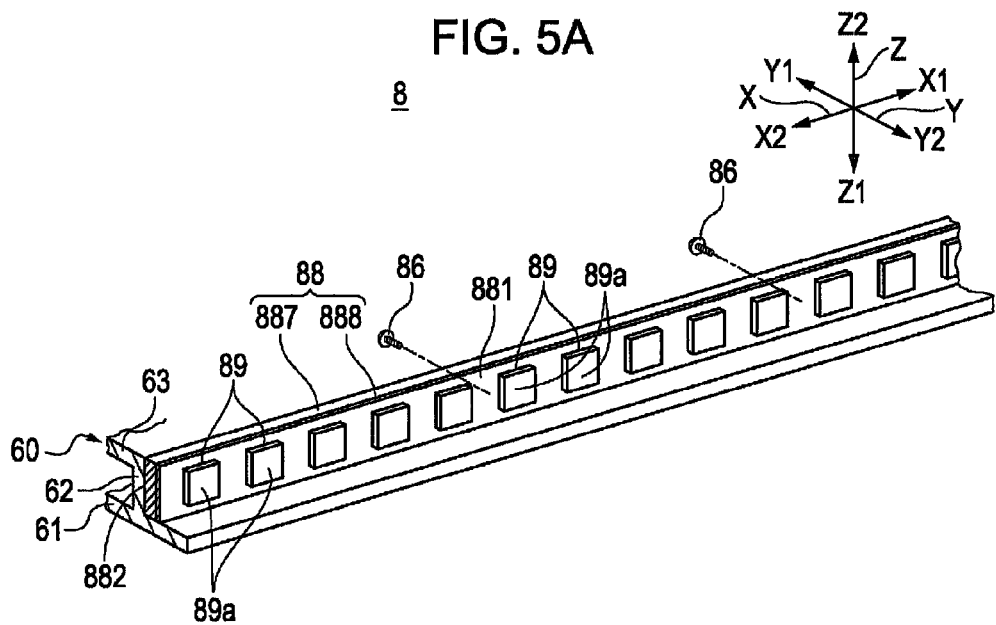
FIGS. 5A, 5B, and 5C are schematic diagrams illustrating the configuration in the vicinity of a light source substrate used in an illumination apparatus of the display apparatus according to the first embodiment of the invention.
Figure 5B:
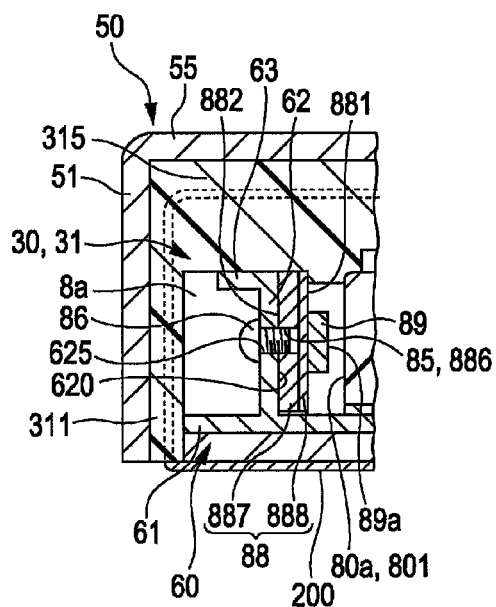
Figure 5C:
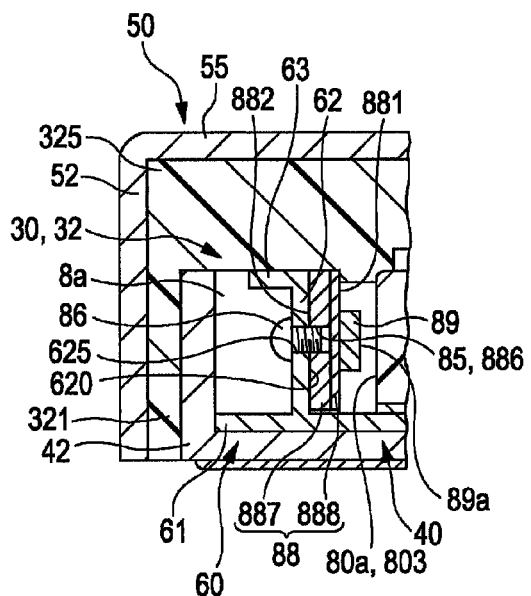

FIGS. 5A, 5B, and 5C are schematic diagrams illustrating the configuration of the vicinity of the light source substrates 88 used in the illumination apparatus 8 of the display apparatus 100 according to the first embodiment of the invention; FIG. 5A is a schematic diagram illustrating one surface of the light source substrate 88; FIG. 5B is a schematic diagram illustrating a position through which a screw is passed, from a side B in a cross-section of the display apparatus 100 taken along the VB-VB line shown in FIG. 1A; and FIG. 5C is a schematic diagram illustrating a position through which a screw is passed, from a side C in a cross-section of the display apparatus 100 taken along the VC-VC line shown in FIG. 1A.

As shown in FIG. 3, FIGS. 4A and 4B, in FIGS. 5A, 5B, and 5C, the illumination apparatus 8 includes: the light guiding plate 80 disposed so as to overlap with the bottom surface of the display panel 10; and a plurality of light-emitting elements 89 arranged from one end of the light-entry portions 80a (the one side X1 in the X-axis direction) toward the other end (the other side X2 in the X-axis direction) with their light-emitting surfaces 89a facing toward the light-entry portions 80a of the light guiding plate 80. In this embodiment, the plurality of light-emitting elements 89 are mounted on one surface 881 (a first surface) of the light source substrate 88 that extends in the X-axis direction following the light-entry portions 80a. The light-emitting elements 89 are LEDs (light-emitting diodes) that emit white light, and emit light source light as divergent light.

In the illumination apparatus 8 according to this embodiment, of the side-end surfaces 801, 802, 803, and 804 of the light guiding plate 80, the two side-end surfaces 801 and 803 opposite to each other in the Y-axis direction are used as the light-entry portions 80a. For this reason, the plurality of light-emitting elements 89 have their light-emitting surfaces 89a pointed toward the two light-entry portions 80a (the side-end surfaces 801 and 803) of the light guiding plate 80, and are arranged from one end toward the other end of each of the two light-entry portions 80a (the side-end surfaces 801 and 803). Meanwhile, the light source substrates 88 are disposed extending along the two light-entry portions 80a (the side-end surfaces 801 and 803), respectively, and the plurality of light-emitting elements 89 are mounted on the respective first surfaces 881 of the two light source substrates 88. Connectors 87 are mounted at one end of the first surfaces 881 of the light source substrates 88, and the connectors 87 are used to supply driving currents to the light-emitting elements 89 via the light source substrates 88.

In this embodiment, the light guiding plate 80 is a light-transmissive resin plate configured of an acrylic resin, a polycarbonate resin, or the like, and a reflective sheet 187 is disposed between a bottom surface 80c of the light guiding plate 80 and the base plate portion 45 of the first frame 40 overlapping therebetween. Meanwhile, an optical sheet such as the diffusion sheet 182, the prism sheets 183 and 184, or the like are disposed in an overlapping manner between a top surface (a light-emitting surface 80b) of the light guiding plate 80 and the display panel 10. In this embodiment, the two prism sheets 183 and 184 are disposed so that their respective ridgelines are orthogonal to each other. Accordingly, illumination light emitted from the light-emitting surface 80b of the light guiding plate 80 is diffused in all directions by the diffusion sheet 182, and is then imparted with directionality by the two prism sheets 183 and 184 so as to have a peak in the forward direction of the display panel 10. A scattering pattern configured of fine concave recesses, the printed layer of a scattering member, or the like is formed on the surface of the light guiding plate 80 located on the side of the reflective sheet 187, and in this embodiment, the density of the scattering pattern becomes greater as the pattern progresses away from the light-emitting elements 89. Accordingly, the intensity distribution of the illumination light emitted from the light guiding plate 80 is made uniform regardless of the distance from the light-emitting elements 89. In this embodiment, many fine recesses 80e are provided in the bottom surface 80c of the light guiding plate 80 as the scattering pattern.

Steps are formed from area to area in a region of the base plate portion 45 of the first frame 40 that overlaps with the side of the light guiding plate 80 in which the side-end surface 801 is located so that a gap can be secured between the bottom surface 80c of the light guiding plate 80 and the first frame 40, and are bent away from the light guiding plate 80. Through this, the reflective sheet 187 and bottom plate portions 61 of light source support members 60 can be held in the gap between the bottom surface 80c of the light guiding plate 80 and the base plate portion 45. Meanwhile, a recess portion is formed toward the rear surface side of the first frame 40 by bending the base plate portion 45 of the first frame 40 away from the light guiding plate 80 partially, and thus the flexible wiring boards 200 are bent as far as the bottom surface (rear surface) of the base plate portion 45 of the first frame 40 and the circuit board 250 is accommodated within the depth of the recess portion. Accordingly, the illumination apparatus 8 can be made thinner.

In this embodiment, the light source substrates 88 are disposed so that the one surfaces 881 (the first surfaces) on which the light-emitting elements 89 are mounted oppose the light-entry portions 80a of the light guiding plate 80. In addition, the light source substrates 88 are structured so that a wiring pattern, lands, and so on are provided along with an insulating layer on the one surfaces 881 (the first surfaces) of plate-shaped metallic plates 887 that extend along the light-entry portions 80a. This configuration can be realized by, for example, affixing, to the one surfaces 881 (the first surfaces) of the metallic plates 887, a flexible wiring board 888 in which a resin base layer, a wiring pattern, and an insulating protective layer or the like are stacked in that order. Accordingly, the lands on which the wiring pattern and the chips for the light-emitting elements 89 are mounted are electrically insulated from the metallic plates 887. In this embodiment, the metallic plates 887 are configured of aluminum plates, and the metallic plates 887 ensure the mechanical strength of the light source substrates 88 and also function as heat dissipation plates that dissipate the heat from the light-emitting elements 89. In this embodiment, a large-scale light source substrate 88 from which many individually-sized light source substrates 88 can be obtained is first manufactured, after which the large-scale light source substrate 88 is cut into the individually-sized light source substrates 88. Accordingly, the side-end surfaces of the metallic plates 887 and the side-end surfaces of the flexible wiring board 888 are cut surfaces that are continuous with each other.

Here, the light source support members 60 that hold the light source substrates 88 are disposed on the other surfaces 882 (second surfaces) of the two light source substrates 88, and the light source support members 60 are disposed and held between the first frame 40 and the second frame 30. In this embodiment, the light source support members 60 are bar-shaped metallic components that extend along the other surfaces 882 (the second surfaces) of the light source substrates 88. Each of the light source support members 60 includes the bottom plate portion 61 that overlaps with the base plate portion 45 of the first frame 40, and a substrate support plate portion 62 that configures a wall surface protruding upward from a location partway along the width direction of the bottom plate portion 61. Furthermore, each of the light source support members 60 includes, toward the upper end of the substrate support plate portion 62 (the side on the opposite side as the bottom plate portion 61), an upper plate portion 63 bent from the substrate support plate portion 62 in the opposite direction as the side on which the light guiding plate 80 is located, and the upper plate portion 63 is anchored to the upper plate portion 55 of the third frame 50 and at least one of upper plate portions 315 and 325 of the second frame 30 using screws or the like.

In the light source support members 60 configured in this manner, the surfaces of the substrate support plate portions 62 on the side on which the light guiding plate 80 is located correspond to substrate holding surfaces 620 (third surfaces) that hold the light source substrates 88, and the light source substrates 88 are anchored to the substrate holding surfaces 620 (the third surfaces) using screws 86 as described hereinafter. In this state, the entire surfaces of the other surfaces 882 (the second surfaces) (the metallic plates 887) of the light source substrates 88 make surface contact with the substrate holding surfaces 620 (the third surfaces) of the light source support members 60, and overlap in a tightly-fitting state. The light source support members 60, meanwhile, are made of a metal such as aluminum, a ferrous metal, or the like. Accordingly, heat produced by the light-emitting elements 89 is transmitted to the light source support members 60 from the metallic plates 887 of the light source substrates 88, and the heat in the light source support members 60 is then transmitted to the first frame 40. This makes it possible to greatly suppress a rise in the temperature of the light-emitting elements 89.

Structure for Anchoring Light Source Substrates 88 to Substrate Support Plate Portion 62

As shown in FIGS. 5A through 5C, in the illumination apparatus 8 of the display apparatus 100 according to this embodiment, the light source substrates 88 are anchored to the substrate support plate portion 62 using screws 86 tightened down into through-holes 625 and 886 from the opposite side (a fourth surface side) as the light source substrates 88, and the screws 86 are not exposed on the one surfaces 881 (the first surfaces) of the light source substrates 88. Here, the screws 86 stop between light-emitting elements 89 in the lengthwise direction of the light source substrates 88; the tip of the screw 86 that has been inserted into the through-hole 886 is in a housed state between the one surface 881 (the first surface) and the other surface 882 (the second surface) of the light source substrate 88 (within the thickness of the light source substrate 88), and the screws 86 and light-emitting elements 89 are disposed so as not to overlap in a planar manner.

In realizing the stated configuration, the through-hole 625 through which the shaft portion of the screw 86 is passed is formed in the substrate support plate portion 62, and a screw tightening hole 85 is formed in the light source substrates 88 in a location that overlaps with the through-hole 625. Accordingly, the shaft portion of the screw 86 is tightened into the hole 85. In this embodiment, the hole 85 in the light source substrates 88 is configured of the through-hole 886 that passes through the metallic plate 887, and the one surface 881 (the first surface) of the through-hole 886 is covered by the flexible wiring board 888. Meanwhile, in this embodiment, the through-hole 625 in the substrate support plate portion 62 is configured of a screw-hole in which screw threads are formed on the inner circumferential surface, and the screw 86 is threaded into the through-hole 625.

In this state, the head of the screw 86 is disposed so that its surface is exposed in a space 8a defined between the second frame 30 and the light source support members 60. In this embodiment, a side plate portion is not provided in the first frame 40 on the one side Y1 in the Y-axis direction (the side on which the overhang portion 110 of the display panel 10 is disposed, and the side to which the flexible wiring boards 200 are connected), and thus as shown in FIG. 5B, the space 8a formed on the one side Y1 of the Y-axis direction is defined by the bottom plate portion 61, the substrate support plate portion 62, and the upper plate portion 63 of the light source support member 60, as well as the side plate portion 311 and the upper plate portion 315 of the second frame 30. As opposed to this, the side plate portion 42 is provided in the first frame 40 on the other side Y2 in the Y-axis direction, and thus as shown in FIG. 5C, the space 8a formed on the other side Y2 in the Y-axis direction is defined by the bottom plate portion 61, the substrate support plate portion 62, and the upper plate portion 63 of the light source support member 60, the upper plate portion 325 of the second frame 30, and the side plate portion 42 of the first frame 40. Meanwhile, the space 8a extends in the X-axis direction along the substrate support plate portion 62 and the like on both the one side Y1 in the Y-axis direction and the other side Y2 in the Y-axis direction.

Method for Anchoring Light Source Substrates 88 to Substrate Support Plate Portion 62

FIGS. 6A through 6G are schematic diagrams illustrating a method for manufacturing the light source substrate 88 used in the illumination apparatus 8 of the display apparatus 100 according to the first embodiment of the invention, and a method for anchoring the light source substrate 88 to the substrate support plate portion 62. Hereinafter, referring to FIGS. 6A through 6G, the configurations of the light source substrate 88, the through-hole 886, and so on will be described in detail while describing the method for manufacturing the light source substrate 88 and the method for anchoring the light source substrate 88 to the substrate support plate portion 62.

Figure 6A:
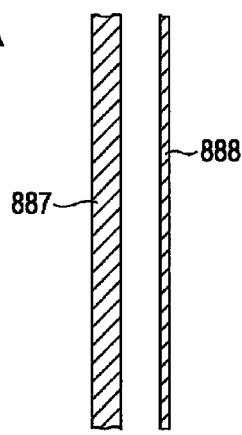
FIGS. 6A through 6G are schematic diagrams illustrating a manufacturing method for a light source substrate used in an illumination apparatus of the display apparatus according to the first embodiment of the invention, and a method for anchoring the light source substrate to a substrate support plate portion.
Figure 6B:
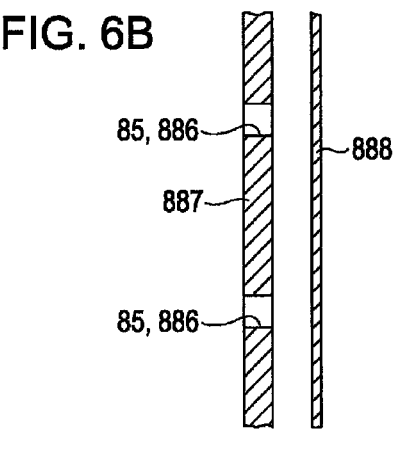

First, when manufacturing the light source substrate 88, as shown in FIG. 6A, a large-scale parent metallic plate 887 from which a plurality of individually-sized light source substrates 88 can be obtained and a large-scale parent flexible wiring board 888 from which a plurality of individually-sized light source substrates 88 can be obtained are prepared, and then, as shown in FIG. 6B, the through-hole 886 that passes through the metallic plate 887 is formed in a region that does not overlap in a planar manner with the regions in which the light-emitting elements 89 are disposed later, as the hole 85 for tightening the screw into the metallic plate 887.

Figure 6C:
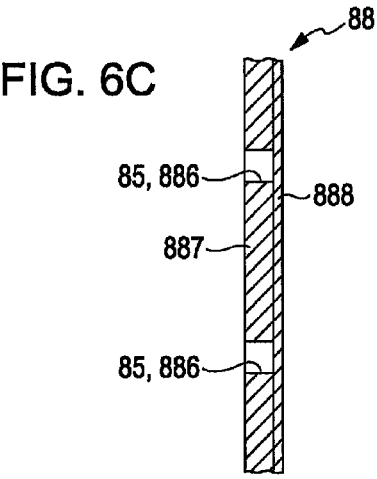

Then, as shown in FIG. 6C, the large-scale light source substrate 88 is formed by affixing one surface of the flexible wiring board 888 to one surface of the metallic plate 887 in a state in which those surfaces oppose each other, using an adhesive, thermal welding, or the like. The flexible wiring board 888, in which a plurality of wires are formed, is affixed from one surface that opposes the metallic plate 887 with a protective coating, which is configured of an insulating layer or the like so that the plurality of wires do not electrically short-circuit with the metallic plate 887, provided on that surface. Meanwhile, mounting lands and the like are provided on the one surface 881 (the first surface) of the light source substrate 88 in an exposed manner, so as to enable the light-emitting elements 89, the connectors 87, and so on to be mounted thereto. In addition, the through-hole 886 provided passing through the metallic plate 887 is structured so as to be covered when the flexible wiring board 888 is affixed.

Figure 6D:
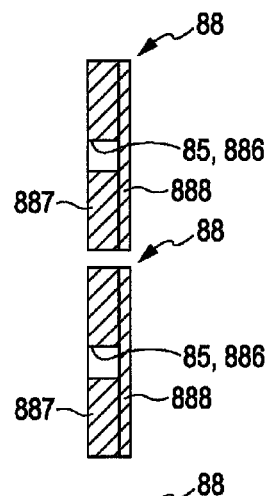

Next, as shown in FIG. 6D, the individually-sized light source substrates 88 are obtained by cutting the large-scale parent light source substrate 88. At this time, the metallic plate 887 and the flexible wiring board 888 are also cut at the same time, and thus the side-end surface of the metallic plate 887 and the side-end surface of the flexible wiring board 888 are continuous cut surfaces. Manufacturing the light source substrate 88 in such a manner makes it possible to form the through-hole 886 in the metallic plate 887 before affixing the metallic plate 887 and the flexible wiring board 888 to each other, which in turn makes it possible to increase the ease of production.

Figure 6E:
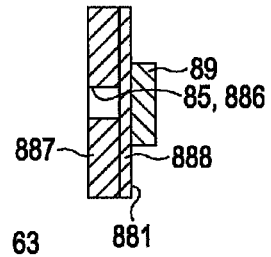

Next, as shown in FIG. 6E, the light-emitting elements 89, connectors 87 (not shown), and so on are mounted to the mounting lands of the flexible wiring board 888 that are exposed on the one surface 881 (the first surface) of the light source substrate 88.

Figure 6F:
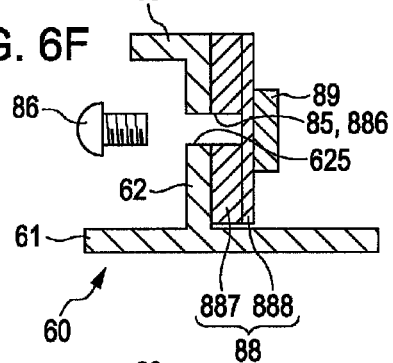
Figure 6G:
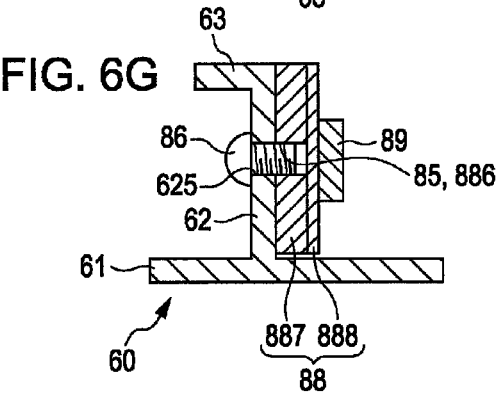

Then, as shown in FIG. 6F, the light source substrate 88 on which the light-emitting elements 89 have been mounted is placed overlapping the substrate support plate portion 62, after which, as shown in FIG. 6G, the screw 86 is tightened down into the substrate support plate portion 62 from the opposite side (the fourth surface side) as the light source substrate 88; this anchors the light source substrate 88 to the substrate support plate portion 62. At this time, the tip of the screw 86 that has been inserted into the through-holes 625 and 886 is disposed so as not to make contact with (reach) the flexible wiring board 888 that has been affixed. Meanwhile, so that the optical effects (the diffusion characteristics and the reflection characteristics) are not affected at the tip of the screw 86 that has been inserted, the flexible wiring board 888 is configured of a material that is not transparent in at least that area, or the one surface 881 (the first surface) of the light source substrate 88 (the other surface of the flexible wiring board 888) is processed so as to have a color such as a reflective white color.

Main Effects of this Embodiment

As described thus far, with the illumination apparatus 8 and display apparatus 100 according to this embodiment, the plurality of light-emitting elements 89 are disposed following the light-entry portion 80a of the light guiding plate 80, and the plurality of light-emitting elements 89 are mounted to the one surface 881 (the first surface) of the light source substrate 88 that extends along the light-entry portion 80a. Here, the substrate support plate portion 62 of the metallic light source support member 60 is disposed so as to overlap with the other surface 882 (the second surface) of the light source substrate 88, and thus heat from the light-emitting elements 89 can escape through the light source substrate 88, the light source support member 60, and the metallic first frame 40.

Meanwhile, the light source substrate 88 is anchored to the substrate support plate portion 62 using the screws 86, and the screws 86 are tightened down into the substrate support plate portion 62 from the opposite side (the fourth surface side) as the light source substrate 88. Accordingly, the screws 86 are not exposed on the side of the one surface 881 (the first surface) of the light source substrate 88. For this reason, portions having uneven light diffusion characteristics caused by the screws 86 do not arise on the side of the one surface 881 (the first surface) of the light source substrate 88, and thus it is difficult for unevenness in the brightness of the illumination light emitted from the light guiding plate 80 to occur. In other words, the structure is such that the surfaces of the screws 86 are not exposed on the side of the one surface 881 (the first surface) of the light source substrate 88, and thus portions where the optical characteristics (the diffusion characteristics and the reflection characteristics) are uneven due to the structure do not appear on the side of the one surface 881 (the first surface) of the light source substrate 88, and thus there is no loss of uniformity of the illumination.

Meanwhile, the light source substrate 88 includes the metallic plate 887 that configures the other surface 882 (the second surface) and the flexible wiring board 888 that is affixed to the metallic plate 887 on the side of the one surface 881 (the first surface), and the through-hole 886 that passes through the metallic plate 887 is formed, as the hole 85 for tightening down a screw, in the location of the light source substrate 88 in which the screw 86 is tightened. Accordingly, the depth of the hole 85 into which the screw 86 is tightened is determined primarily based on an appropriate depth depending on the thickness of the metallic plate 887, and thus problems caused by the hole 85 being too deep, problems caused by the hole 85 being too shallow, and so on do not occur.

In addition, the through-hole 886 is formed in a position that is not overlap with the locations where the light-emitting elements 89 are mounted, and thus in the step illustrated in FIG. 6E, the through-hole 886 does not interfere when mounting the light-emitting elements 89. Accordingly, the light-emitting elements 89 can be mounted properly.

In addition, because the metallic plate 887 is thicker than the flexible wiring board 888, the flexible wiring board 888 can be supported with certainty, and furthermore, the heat produced by the light-emitting elements 89 can be allowed to escape via the metallic plate 887 with certainty.

In addition, because the through-hole 886 is a screw hole, a large force is not applied to the light source substrate 88 when tightening down the screw 86. Accordingly, the light source substrate 88 can be prevented from deforming, which in turn makes it possible to prevent the optical axes of the light-emitting elements 89 from tilting.

In addition, in this embodiment, the one surface 881 (the first surface) of the light source substrate 88 opposes the light-entry portion 80*a* of the light guiding plate 80. With such a configuration, it is easy for problems to arise due to the screw 86 being exposed on the side of the one surface 881 (the first surface), but according to this embodiment, the occurrence of such a problem can be prevented.

Second Embodiment

Figure 7:
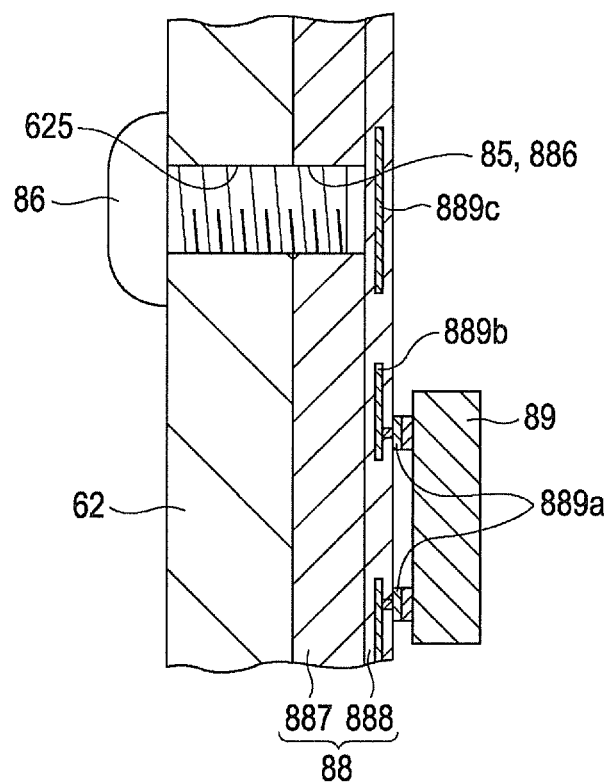
FIG. 7 is a schematic diagram illustrating a light source substrate used in an illumination apparatus of a display apparatus according to a second embodiment of the invention.

FIG. 7 is a schematic diagram illustrating the light source substrate 88 used in the illumination apparatus 8 of the display apparatus 100 according to a second embodiment of the invention. Note that the basic configuration in this embodiment is the same as that in the first embodiment, and thus corresponding constituent elements will be given the same reference numerals, and descriptions thereof will be omitted.

As shown in FIG. 7, according to the light source substrate 88 used in this embodiment as well, the light source substrate 88 is anchored to the substrate support plate portion 62 using the screws 86 that are tightened down from the opposite side (the fourth surface side) as the light source substrate 88, and the screws 86 are not exposed on the side of the one surface 881 (the first surface) of the light source substrate 88. In addition, the screws 86 do not overlap with the light-emitting elements 89. Here, the through-hole 886 is formed in the metallic plate 887, and the side of the through-hole 886 located toward the one surface 881 (the first surface) is covered by the flexible wiring board 888.

In this light source substrate 88, lands 889*a*, wires 889*b*, and so on are formed in the flexible wiring board 888 in correspondence with the light-emitting elements 89. In addition, in this embodiment, a metallic layer 889*c* configured of the same layer as the lands 889*a*, the wires 889*b*, and so on is formed in a region of the flexible wiring board 888 that overlaps with the through-hole 625. Accordingly, the tips of the screws 86 are covered by the metallic layer 889*c*, and thus the diffusion characteristics at the tips of the screws 86 are not transmitted through the flexible wiring board 888 to the side of the one surface 881 (the first surface).

Third Embodiment

Figure 8A:
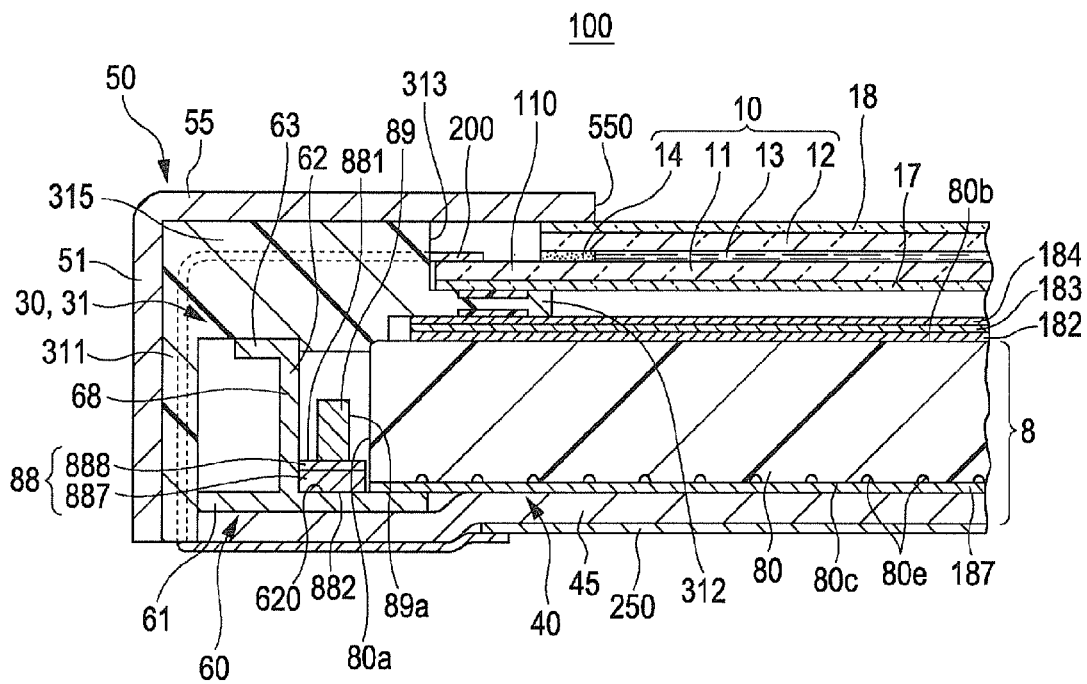
FIGS. 8A and 8B are cross-sectional views illustrating the main elements of a display apparatus according to a third embodiment of the invention.
Figure 8B:
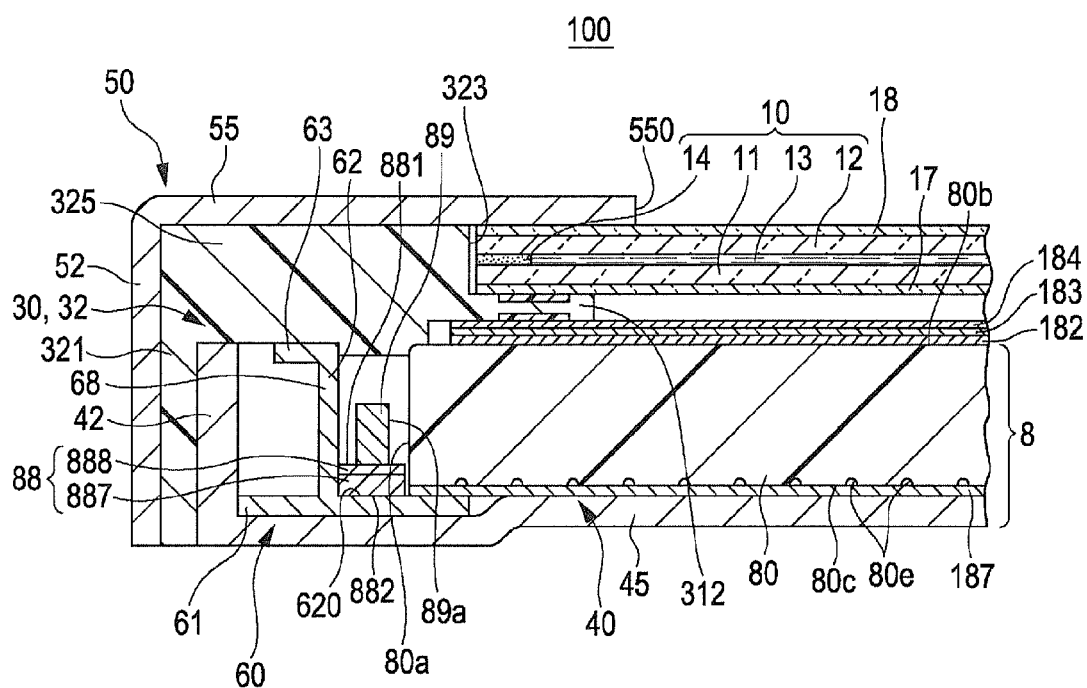
Figure 9:
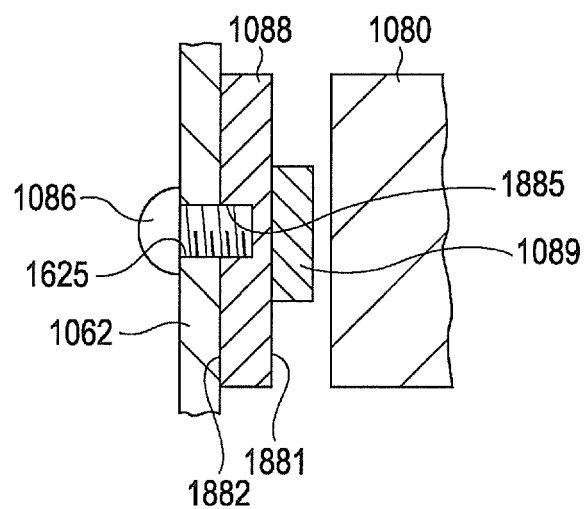
FIG. 9 is a cross-sectional view of an illumination apparatus according to past art.

FIGS. 8A and 8B are cross-sectional views illustrating the main elements of the display apparatus 100 according to a third embodiment of the invention; FIG. 8A corresponds to a cross-section taken along the IVA-IVA line shown in FIG. 1, and FIG. 8B corresponds to a cross-section taken along the IVB-IVB line shown in FIG. 1. Note that the basic configuration in this embodiment is the same as that in the first embodiment, and thus corresponding constituent elements will be given the same reference numerals, and descriptions thereof will be omitted.

Although the aforementioned first and second embodiments describe a configuration in which the one surface 881 (the first surface) in the light source substrate 88 on which the light-emitting elements 89 are mounted is opposed to the light-entry portion 80*a* of the light guiding plate 80, in this embodiment, as shown in FIGS. 8A and 8B, the one surface 881 (the first surface) in the light source substrate 88 on which the light-emitting elements 89 are mounted is oriented in the direction that intersects with the light-entry portion 80*a* of the light guiding plate 80 at a 90° angle. However, the light-emitting surfaces 89*a* of the light-emitting elements 89 face in a direction that is perpendicular to the one surface 881 (the first surface) of the light source substrate 88. Accordingly, the light-emitting elements 89 can emit the light source light into the interior of the light guiding plate 80 from the light-entry portion 80*a*.

With the illumination apparatus 8 configured in this manner, in the light source support member 60, a vertical plate portion 68 is opposed to the light-entry portion 80*a* of the light guiding plate 80, and in the light source support member 60, the first frame 40 is positioned on the rear surface side of the substrate support plate portion 62. Even in such a case, if a configuration in which openings are provided from area to area in the base plate portion 45 of the first frame 40, a configuration in which recesses are provided on the rear surface side of the substrate support plate portion 62, or the like is employed, screws (not shown) can be tightened into the substrate support plate portion 62 from the opposite side as the light source substrate 88, and thus the light source substrate 88 can be anchored to the substrate support plate portion 62 using the screws. In that case as well, if the invention is applied, when forming through-holes that pass through the metallic plate 887, the depth of the holes for tightening the screws is determined primarily based on the appropriate depth according to the thickness of the metallic plate 887. Accordingly, the same effects as those in the first embodiment, in which problems caused by the holes being too deep, problems caused by the holes being too shallow, and so on do not arise, can be achieved.

Example of Installation in Electronic Device

Although the aforementioned embodiments describe an LCD television as an example of the electronic device 2000 in which the display apparatus 100 is installed, the display apparatus 100 in which the invention is applied may also be used in the display units of electronic devices such as personal computer, digital signage, car navigation devices, and mobile information terminals, in addition to LCD televisions.

The entire disclosure of Japanese Patent Application No. 2011-161708, filed Jul. 25, 2011, No. 2011-253716, filed Nov. 21, 2011 and No. 2011-253717, filed Nov. 21, 2011 are expressly incorporated by reference herein.

What is claimed is:

1. An illumination apparatus comprising:

a light guiding plate;

a plurality of light-emitting elements disposed along a side-end surface of the light guiding plate that serves as a light-entry portion, each of the plurality of light-emitting elements has a light-emitting surface facing toward the side-end surface;

a light source substrate that extends along a direction which the side-end surface extends, a first surface of the light source substrate on which the plurality of light-emitting elements are mounted, and a second surface which is another surface of the light source substrate that opposes the first surface;

a substrate support portion which has a third surface that faces the second surface and a fourth surface that opposes the third surface; and a screw that tightens the light source substrate to the substrate support portion from the fourth surface without being exposed on the first surface of the light source substrate, wherein the light source substrate includes a first substrate that configures the second surface and a second substrate that configures the first surface; and a through-hole that passes through the first substrate but does not pass through the second substrate, the through-hole being formed in a location of the light source substrate where the screw is tightened down.

2. The illumination apparatus according to claim 1, wherein the through-hole is formed in a location that does not overlap with locations where the plurality of light-emitting elements are mounted.

3. The illumination apparatus according to claim 1, wherein the first substrate is a metallic plate, and the second substrate is a flexible wiring board that is affixed to the first substrate on a side of the first surface.

4. The illumination apparatus according to claim 3, wherein a metallic layer is formed in a region of the flexible wiring board that overlaps with the through-hole.

5. The illumination apparatus according to claim 1, wherein a side-end surface of the first substrate and a side-end surface of the second substrate are cut surfaces that are continuous with each other.

6. The illumination apparatus according to claim 1, wherein the through-hole is a screw hole.

7. The illumination apparatus according to claim 1, wherein the substrate support portion is made of a metal.

8. The illumination apparatus according to claim 1, wherein the first substrate is thicker than the second substrate.

9. The illumination apparatus according to claim 1, wherein the first surface of the light source substrate opposes the light-entry portion.

10. A display apparatus provided with the illumination apparatus according to claim 1, the display apparatus comprising:

a display panel disposed overlapping a light-emitting surface side of the light guiding plate.

11. An electronic apparatus comprising the display apparatus according to claim 10.

* * * * *